US012702885B2

(12) United States Patent
MacKenzie et al.

(10) Patent No.: US 12,702,885 B2
(45) Date of Patent: Aug. 11, 2026

(54) APPARATUS AND METHOD FOR TESTING A FIRE SUPPRESSION SYSTEM

(71) Applicant: Paradigm Flow Services Limited, Aberdeenshire (GB)

(72) Inventors: Hugh MacKenzie, Aberdeenshire (GB); Ashley Thomson, Aberdeenshire (GB)

(73) Assignee: Paradigm Flow Services Limited, Aberdeenshire (GB)

( * ) Notice: Subject to any disclaimer, the term of this patent is extended or adjusted under 35 U.S.C. 154(b) by 599 days.

(21) Appl. No.: 18/008,536

(22) PCT Filed: Jun. 8, 2021

(86) PCT No.: PCT/GB2021/051413
§ 371 (c)(1),
(2) Date: Dec. 6, 2022

(87) PCT Pub. No.: WO2021/250389
PCT Pub. Date: Dec. 16, 2021

(65) Prior Publication Data
US 2023/0338767 A1 Oct. 26, 2023

(30) Foreign Application Priority Data
Jun. 8, 2020 (GB) ..................................... 2008644

(51) Int. Cl.
*A62C 37/50* (2006.01)

(52) U.S. Cl.
CPC .................................... *A62C 37/50* (2013.01)

(58) Field of Classification Search
CPC ................................ A62C 37/50; A62C 35/62
See application file for complete search history.

(56) References Cited

U.S. PATENT DOCUMENTS 5,950,150 A 9/1999 Lloyd et al.
7,144,203 B2 * 12/2006 Gerber .................. B65G 53/66 406/14
7,735,743 B2 * 6/2010 Jaeschke .................. F23N 5/18 236/11
8,701,789 B2 * 4/2014 Kruger .................... A62C 5/02 169/44

(Continued)

FOREIGN PATENT DOCUMENTS

CN 203417424 U 2/2014
CN 109715253 A 5/2019

(Continued)

OTHER PUBLICATIONS

Paradigm Group BV "Dry Flo" [online] Jul. 18, 2016; Availabe from: https://www.youtube.com/watch?v=ngmvoHcH4gE (Accessed Nov. 26, 2021 (Video listed in GB Search Report—NPL 2, below) (Video not available).

(Continued)

*Primary Examiner* — Octavia Hollington
(74) *Attorney, Agent, or Firm* — Dickinson Wright PLLC

(57) ABSTRACT

An apparatus for testing a water deluge system having a wet side and a dry side separated by a valve comprises a blower configured for coupling to an inlet of the water deluge system. The blower provides a supply of pressurised air through the water deluge system from the inlet to one or more outlets of the water deluge system. A sensor arrangement is associated with one or more of the outlets and configured to measure the pressure of the air at the one or more outlets and then output one or more output signals indicative of the pressure of the air at the one or more outlets. A communication arrangement conveys the one or more output signals from the sensor arrangement to a processing system configured to determine from said one or more output signals the flow rate of the air supply at the one or more outlets.

22 Claims, 9 Drawing Sheets

(56) References Cited

U.S. PATENT DOCUMENTS

| | | | | |
|---|---|---|---|---|
| 8,749,393 | B1 | 6/2014 | Tollefson | |
| 10,426,983 | B2 * | 10/2019 | Hennegan | A62C 35/62 |
| 10,870,028 | B2 * | 12/2020 | Groen | A62C 37/14 |
| 11,965,695 | B2 * | 4/2024 | Xu | F26B 21/33 |
| 12,544,611 | B2 * | 2/2026 | Mackenzie | A62C 3/0221 |
| 2007/0003891 | A1 | 1/2007 | Jaeschke | |
| 2010/0263882 | A1 * | 10/2010 | Bodemann | F16K 15/04 137/15.04 |
| 2016/0054158 | A1 * | 2/2016 | Mackenzie | G01F 1/053 73/49.5 |
| 2016/0101306 | A1 * | 4/2016 | Hennegan | A62C 37/36 169/17 |
| 2023/0272809 | A1 * | 8/2023 | Kokot | F04C 29/124 60/327 |
| 2023/0381565 | A1 * | 11/2023 | Mackenzie | A62C 35/62 |

FOREIGN PATENT DOCUMENTS

| | | | | |
|---|---|---|---|---|
| CN | 110548238 | A * | 12/2019 | |
| DE | 102010050505 | A1 | 5/2012 | |
| EP | 0209388 | A2 | 1/1987 | |
| JP | H10272199 | A | 10/1998 | |
| KR | 101598869 | B1 | 3/2016 | |
| WO | 201206248 | A1 | 1/2012 | |
| WO | 2014133386 | A2 | 9/2014 | |
| WO | 2014147418 | A2 | 9/2014 | |
| WO | WO-2019148207 | A1 * | 8/2019 | B01D 53/047 |

OTHER PUBLICATIONS

GB Search and Examination Report; Appl. No. GB2008644.3; Nov. 29, 2021; 7 pages.

Hydraulic Transmission and Pneumatic Transmission, Yang Shudong et al., p. 28, Huazhong University of Science and Technology Press, Dec. 2019. (no English abstract available).

Dust Removal Theory and Technology, Xiang Xiaodong et al., pp. 174-175, Metallurgical Industry Press, Jan. 2013. (no English abstract available).

Japanese Office Action dated Jul. 22, 2025 (no English translation available).

Chinese Office Action dated Jul. 28, 2025.

* cited by examiner

APPARATUS AND METHOD FOR TESTING A FIRE SUPPRESSION SYSTEM

CROSS-REFERENCE TO RELATED APPLICATIONS

The present invention claims priority to PCT International Patent Application Serial No. PCT/GB2021/051413 filed Jun. 8, 2021 entitled "APPARATUS AND METHOD FOR TESTING A FIRE SUPPRESSION SYSTEM," which claims the benefit of GB Patent Application Serial No. 2008644.3 filed Jun. 8, 2020, the entire disclosures of the applications being considered part of the disclosure of this application and hereby incorporated by reference.

FIELD

This relates to an apparatus and method for testing a fire suppression system, in particular but not exclusively a water deluge system.

BACKGROUND

Fire suppression systems are a critical safety component of any large building or facility. In the oil and gas industry, for example, the first suppression system on both offshore and onshore installations typically takes the form of a water deluge system which is capable of rapidly dispensing a large volume of water over a given target area. In contrast to fire sprinkler systems which include a network of sprinkler outlets maintained in a closed position until activated, a water deluge system has a dry side including a network of pipes and outlets which are maintained in an open condition and a wet side connected to a fire main or other water supply, the dry side and wet side of the water deluge system being separated by a valve, known as a deluge valve. When the deluge valve is opened, water enters the dry side of the water deluge system and is dispensed over the target area via the network of pipes and open nozzles until the deluge valve is closed.

Given the safety critical nature of fire suppression systems, the water deluge system must be subjected to regular testing and maintenance to ensure that the system is capable of operating effectively when needed. For example, typical problems with water deluge system include internal corrosion, corrosion deposits and/or marine growth, any of which may restrict water flow in the pipe network and/or block nozzles of the water deluge system.

Conventional testing techniques involve a "wet test" whereby the water deluge system is activated for a test period, for example 30 minutes, and the water deluge system is manually checked for blocked or restricted nozzles by operators wearing appropriate personal protective equipment. This may involve placing a number of receptacles beneath specific areas of the water deluge system to collect dispensed water, the collected volume of water then being compared with the expected volume to determine whether the system is working within expected parameters.

Computer modelling systems have also been developed which model the specific water deluge system being tested, and calculate expected fluid pressures at nozzles using pressure sensors. Two locations are checked: near the inlet; and near the furthermost nozzle from the inlet. When the wet test is performed, the pressure readings taken are compared with the modelled pressure values to infer whether a problem exists.

There are a number of drawbacks with conventional techniques and equipment.

For example, conventional wet test techniques—including computer modelling systems—rely on wet tests being performed each and every time that information is required on the condition of the water deluge system. However, wet tests by their nature rely on large volumes of water being dispensed into operational areas, typically for a test period of around 30 minutes for each region of the facility being tested. As such, it will be recognised that wet testing a large facility such as an oil and gas installation, will involve a significant amount of time where normal operations are restricted.

Prior to each wet test, sensitive equipment must also be "bagged off" to protect it from the water dispensed during the wet test, which is time-consuming and can be unreliable. Exposure of such sensitive equipment to the water flow risks equipment failure, requiring repair or replacement at significant expense, inconvenience and lost revenue.

Also, personnel are liable to be exposed to the water flow and therefore must wear protective clothing which may impede their mobility and ability to perform their duties.

Water exposure from wet tests can also cause corrosion in the facility, in particular in offshore oil and gas installations due to the marine environment. Indeed, given that offshore installations typically use seawater to perform the wet test, the required regular wet test regime may in fact exacerbate corrosion within and contribute to choking of the water deluge system. Moreover, since seawater contains marine organisms, the use of wet tests also results in marine growth, which may also contribute to choking of the water deluge system.

Other fire suppression systems include nitrogen fire suppression systems where nitrogen gas is used to suppress a fire by reducing the oxygen content within the affected area to a point where the fire will be extinguished.

SUMMARY

Aspects of the present disclosure relate to an apparatus and method for testing a fire suppression system, such as a water deluge system or an inert gas fire suppression system.

According to a first aspect, there is provided an apparatus for testing a water deluge system having a wet side and a dry side separated by a valve, the apparatus comprising:

- a blower configured for coupling to an inlet of the water deluge system, the blower configured to provide a supply of pressurised air through the water deluge system from the inlet to one or more outlet of the water deluge system;
- a sensor arrangement coupled to or operatively associated with one or more of the outlets of the water deluge system, the sensor arrangement configured to measure the pressure of the air at the one or more outlets of the water deluge system and output one or more output signals indicative of the pressure of the air at the one or more outlets; and
- a communication arrangement configured to convey the one or more output signals from the sensor arrangement to a processing system configured to determine from said one or more output signals the flow rate of the air supply at the one or more outlets.

In use, the apparatus is operable to perform a test on the water deluge system by flowing low gauge pressure pressurised air through the water deluge system and measure the pressure of the air at one or more outlets, in particular but not exclusively a plurality of the outlets, of the water deluge system during a selected test time period.

The apparatus obviates the requirement to carry out regular wet tests to verify that the water deluge system will operate effectively if and when required. This has a number of significant benefits. For example, the apparatus obviates the time, expense, and inconvenience involved in preparing for the wet test, such as arranging receptacles to collect dispensed water from the water deluge system and in bagging sensitive equipment, as well as the time, expense, inconvenience and inaccuracies involved in performing the wet test. Personnel are also not exposed to water flow and are thus unimpeded in carrying out their duties. The ability of the apparatus to carry out a test of the water deluge system without the requirement for a wet test also reduces the risk of corrosion in the water deluge system and elsewhere in the installation.

Moreover, the apparatus occupies a relatively small footprint on the installation. This is particularly beneficial on offshore oil and gas installations, such as a platform or rig, in which deck space is typically limited and which may prevent conventional test equipment from being installed on a permanent basis.

The apparatus may comprise or take the form of a permanent installation on the facility to be tested. At least part of the apparatus may be configured to be permanently coupled to the water deluge system.

It will be recognised, however, that at least part of the apparatus may alternatively comprise or take the form of a temporary and/or retrofit installation on the facility to be tested. At least part of the apparatus may be configured to be removably coupled to the water deluge system.

The apparatus may comprise, may be coupled to, or operatively associated with, the processing system.

In some embodiments, the processing system, or part of the processing system, may form part of the apparatus. Alternatively or additionally, the processing system, or part of the processing system, may be coupled to or operatively associated with the system. For example, the processing system may be located at one or more remote location. The remote location may comprise or take the form of a mobile device such as tablet, mobile phone or the like. Alternatively or additionally, the remote location may comprise or take the form of a control room. Alternatively or additionally, the remote location may comprise or take the form of a data store, such as an online data store.

As described above, the processing system is configured to determine the flow rate of the air supply at the one or more outlets.

Testing a water deluge system involves assessing the density application rate of the system, that is whether the system is capable of delivering the required flow rate of water to a given application area in order to suppress a fire. The density application rate is given by:

$$\text{Density Application Rate} = \frac{\text{Flowrate from outlet}}{\text{Area of Coverage}}$$

The area of coverage is fixed and is determined by the design of the water deluge system and any modifications after installation. However, the flow rate from the outlet(s) can vary if restrictions are present within the water deluge system. At low gauge pressure, air replicates the flow of water. Thus, by determining the flow rate of the air from the one or more outlets Q (Litres/min), the deluge system can be tested without the requirement for wet tests.

The upstream flow rate and pressure are unique to the condition of the system, i.e. if pressure is plotted against flow rate, all points on the plot are unique to the condition of the system. This is particularly useful when plotted for a clean system.

The apparatus may be configured to operate in different modes. For example, the apparatus may be configured to operate in a "Find Restriction" mode. In the "Find Restriction" mode, the apparatus may gather data from some or all of the instrumentation for post processing and identification of restrictions. Alternatively or additionally, the apparatus may be configured to operate in a 'Flow Assurance" mode. In the "Flow Assurance" mode, the apparatus may only analyse the inlet values (e.g. pressure, flow rate, etc).

As described above, the apparatus comprises a blower configured for coupling to the water deluge system.

The apparatus may be coupled to the system by any suitable means. In particular embodiments, the apparatus may be coupled via one or more of: a drain line, a groove-lock clamp type tie-in, or by permanent modification to the deluge system.

The blower may be configured to intake air at atmospheric pressure and provide an exhaust air supply to the water deluge system at higher air pressure than atmospheric pressure. For example but not exclusively, the blower may be configured to provide exhaust air supply at a maximum gauge pressure of 0.7 bar and a flow rate of 0 $Ft^3$/min to 1000 $Ft^3$/min.

Beneficially, the blower is capable of directing a flow of air at high flow and relatively low gauge pressure, i.e., higher pressure than atmospheric pressure but lower than high pressure air systems, into and through the water deluge system, and thus obviates or at least reduces the requirement for a gas source such as an accumulator, an air receiver such as a bank of compressed air cylinders and/or a pressure regulator skid.

The blower may occupy a relatively small footprint and/or may be relatively lightweight. For example, but not exclusively, the blower may occupy a space of approximately 2 m by approximately 2 m and may have a mass of less than 1500 kg. This is particularly beneficial in offshore installations, such as platforms, rigs and the like, due to the size and weight limitations for transportation to/from the installation and/or where deck space is typically limited and which may prevent conventional test equipment from being installed on a permanent basis.

The blower may comprise a pump. The pump may take the form of a single stage pump. However, in particular embodiments the pump takes the form of a multi-stage pump, i.e. having a plurality of impeller stages. For example, the pump may comprise a four stage multi-stage pump. Alternatively, the pump may comprise an eight stage multi-stage pump. However, it will be recognised that the pump may comprise any suitable number of stages. The pump may take the form of a centrifugal pump. In particular embodiments, the blower comprises a multi-stage centrifugal pump. Beneficially, the multi-stage centrifugal pump provides a blower which is capable of directing a flow of air at high flow and relatively low gauge pressure, i.e., higher pressure than atmospheric pressure, into and through the water deluge system, and obviates or at least reduces the requirement for a gas source such as an accumulator, an air receiver such as a bank of compressed air cylinders and/or a pressure regulator skid. This is particularly beneficial in offshore installations, such as platform, rigs and the like, due to the size and weight limitations for transportation to/from the installation and/or where deck space is typically limited and which may prevent conventional test equipment from being installed on a permanent basis.

The blower may comprise a motor. The motor may be coupled to the pump. The motor may be configured to drive the pump. The motor may be directly coupled to the pump. Alternatively, the motor may be indirectly coupled to the pump, for example via a transmission system. The transmission system may for example comprise a gearbox, a belt drive, or other suitable transmission system.

As described above, the blower is configured for coupling to the water deluge system.

The blower may be configured for coupling to a valve ("inlet valve") coupled to or forming part of the water deluge system. The inlet valve may be configured to control fluid communication of air between the apparatus and the water deluge system.

The valve may comprise a non-return arrangement. In use, the non-return arrangement may prevent backflow of air from the water deluge system.

The blower may be configured for coupling to the water deluge system, for example the inlet valve, by a fluid conduit. The fluid conduit may comprise or take the form of a hose.

Alternatively, the blower may be directly coupled to the water deluge system, for example the inlet valve.

The apparatus may comprise a connector arrangement for directly coupling the blower to the water deluge system.

The blower may comprise or take the form of an electric blower. Beneficially, the provision of an electrically powered blower permits the apparatus to be coupled to the electrical supply of the facility containing the water deluge system, and obviates the footprint on site and transportation requirements associated with a dedicated power supply, such as a generator.

However, it will be understood that in some instances the apparatus may comprise a dedicated power supply, such as a generator.

The blower may comprise, may be coupled to, or operatively associated with a variable frequency drive (VFD). Beneficially, the variable frequency drive permits fine control over the delivered pressure or flow rate from the blower.

The blower may comprise, or may be housed in, an enclosure. Accordingly, the apparatus may be utilised in hazardous areas-environments in which for example gases, vapours, mists and dust can form an explosive atmosphere with air.

The apparatus may be configured to control the humidity of the air supply.

The apparatus may be configured to match the humidity of the air supply to the water deluge system when carrying out the test to a reference humidity. The reference humidity may take the form of the humidity of the air in the deluge system when the deluge system was commissioned or otherwise known to be free from obstructions.

The apparatus may comprise an air conditioner configured to control the humidity of the air supply.

The apparatus may comprise a moisture filter. The moisture filter may be provided at an inlet of the blower. Beneficially, the provision of a moisture filter may permit the humidity of the air supply to the apparatus to be controlled.

The apparatus, in particular the processing system, may be configured to assess any error which may be induced by humidity and may indicate (if required) the minimum humidity level reduction required at the inlet which the blower may then provide.

The apparatus may be configured to determine the likelihood of condensation of the blown air in the deluge system. This may be achieved by mathematical processing of measured values which may include atmospheric humidity and temperature and the pressure and temperature at multiple locations, which may be at the sensor location(s)) in the deluge system.

As described above, the apparatus comprises a sensor arrangement coupled to or operatively associated with one or more outlets of the water deluge system, the sensor arrangement configured to measure the pressure of the air at the one or more outlets of the water deluge system and output one or more output signal indicative of the pressure of the air at the one or more outlets.

The sensor arrangement may comprise a sensor configured for coupling to or operatively associated with an outlet of the water deluge system.

The sensor arrangement comprises a plurality of sensors.

At least one of the sensors may be coupled to or operatively associated with an outlet of the water deluge system.

The sensor arrangement may comprise sensors coupled to or operatively associated with a subset of the outlets of the water deluge system.

Alternatively, the sensor arrangement may comprise sensors coupled to or operatively associated with all of the outlets of the water deluge system.

The sensor arrangement coupled to or operatively associated with one or more outlets of the water deluge system may be configured to measure temperature of the air at the one or more of the outlets.

The sensor arrangement may comprise one or more temperature sensor.

At least one of the sensors may be configured to be removably coupled to the water deluge system.

The sensor may comprise a connector for connecting the sensor to the associated outlet. The connector may comprise a threaded connector, a bayonet-type connector, or other suitable removable connector.

At least one of the sensors may be configured to be permanently coupled to the water deluge system.

The sensor may be integrally formed or coupled to the associated outlet.

The sensor may be bonded to the associated outlet, for example by an adhesive.

The sensor may comprise a battery, which may be rechargeable battery.

The sensor may comprise a sensor control module.

The sensor control module may control the state of the sensor.

For example, the sensor control module may control whether the sensor should be in an awake state or a sleep state.

As described above, the sensor arrangement is configured to measure the pressure of the air at one or more outlets of the water deluge system.

The sensor arrangement may comprise one or more pressure sensors.

The sensor arrangement may comprise at least one sensor coupled to or operatively associated with the inlet to the deluge system.

The sensor arrangement may comprise one or more sensor configured to measure the flow of the air at the inlet valve. The one or more sensor may comprise or take the form of a flow meter.

The sensor arrangement may comprise one or more sensor configured to measure the pressure of the air at the inlet valve. The sensor may comprise or take the form of a pressure sensor.

The sensor coupled to or operatively associated with the inlet may be configured to measure temperature. The sensor may comprise a temperature sensor.

In use, at the upstream, inlet, end, the one or more sensor configured to measure flow rate of air may be used to measure either or both of volumetric and/or mass flow rate. At the downstream end, by fitting an additional flow device, the pressure sensor measurement may be used to derive the equivalent flow rate at the outlets.

The apparatus may comprise a filter arrangement. For example, the apparatus may comprise one or more particulate filter.

At least one, and in particular embodiments all of the sensors may be temperature compensated, such that there is therefore no or minimal measurement error as a result of variations in ambient temperature.

As described above, the apparatus comprises a communication arrangement configured to convey the one or more output signals from the sensor arrangement to the processing system.

The communication arrangement may comprise a communications module. The communications module may form part of the sensor, may be coupled to the sensor or may be operatively associated with the sensor of the sensor arrangement.

In particular embodiments, the communications module comprises a wireless communications module. The communications module may be configured to communicate over a cellular communications network, Wi-Fi, Bluetooth, ZigBee, NFC, IR, satellite communications, other internet enabling networks and/or the like.

Alternatively or additionally, the communications module may comprise a wired communications module. The communications module may be configured to communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network.

The communications module may be configured to communicate via optical communications such as optical wireless communications (OWC), optical free space communications or Li-Fi or via optical fibres and/or the like.

The communication arrangement may comprise a receiver configured to receive the output signal from the sensor arrangement. The communication arrangement may comprise a transmitter configured to transmit commands to the sensor arrangement, for example to the sensor control module. The communication arrangement may comprise a transceiver.

The communication arrangement may comprise a communications module. The communications module may form part of the sensor, may be coupled to the sensor or may be operatively associated with the sensor at the inlet valve.

In particular embodiments, the communications module comprises a wireless communications module. The communications module may be configured to communicate over a cellular communications network, Wi-Fi, Bluetooth, ZigBee, NFC, IR, satellite communications, other internet enabling networks and/or the like.

Alternatively or additionally, the communications module may comprise a wired communications module. The communications module may be configured to communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network.

The communications module may be configured to communicate via optical communications such as optical wireless communications (OWC), optical free space communications or Li-Fi or via optical fibres and/or the like.

The sensor at the inlet valve may comprise a receiver. The sensor at the inlet valve may comprise a transmitter. The sensor at the inlet valve may comprise a transceiver.

The communication arrangement may comprise a receiver configured to receive the output signal from the sensor at the inlet valve. The communication arrangement may comprise a transmitter configured to transmit commands to the sensor at the inlet valve, for example to the sensor control module. The communication arrangement may comprise a transceiver.

The apparatus may comprise, may be coupled to, or operatively associated with a data acquisition device.

The data acquisition device may be coupled to, or may communicate with, the sensor arrangement wirelessly. The data acquisition device may be configured to communicate over a cellular communications network, Wi-Fi, Bluetooth, ZigBee, NFC, IR, satellite communications, other internet enabling networks and/or the like.

Alternatively or additionally, the data acquisition device may communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network.

The data acquisition device may be configured to communicate via optical communications such as optical wireless communications (OWC), optical free space communications or Li-Fi or via optical fibres and/or the like.

The data acquisition device may be coupled to and/or may communicate with a control room console on the facility. The communication arrangement is configured to convey the output signal to a data acquisition device. Alternatively or additionally, the data acquisition device may be coupled to and/or may communicate with a remote facility. Alternatively or additionally, the data acquisition device may be coupled to and/or may communicate with a mobile device, such as a phone, tablet device or the like.

The apparatus may comprise, or may communicate with a control system.

The control system may determine the condition of the water deluge system from the output signals from the sensors.

The control system may form part of the data acquisition device, or may comprise a separate system located on the facility, at a remote facility and/or may be a cloud based system.

The control system may be configured to control operation of the inlet valve. Beneficially, automatic control of the inlet valve removes the requirement for manual operation which leads to inaccuracies in the test results.

The control system may be configured to control operation of the deluge valve.

The processing system may form part of the control system.

The apparatus may comprise instrumentation configured to measure one or more of: blower speed, atmospheric temperature, pressure, humidity, temperature, humidity and pressure at the inlet side of the blower, temperature, pressure and humidity at the outlet side of the blower, flow rate at the outlet side of the blower which may be both volumetric and mass. The blower speed may also be used to derive volumetric flow rate and/or mass flow rate.

Multiple redundancy of the instrumentation may be provided. For example, the apparatus may comprise a plurality of instruments for measuring at least one of the above properties of the apparatus. The instruments for measuring at least one of the above properties of the apparatus may be located at one or more location, and in particular at each locations where the instrumentation is provided.

The apparatus may be configured to record data from the instrumentation described for a fixed air flow rate or air pressure of for a variable flow rate or pressure. An example of the latter would be the apparatus recording data from the instrumentation as the flow rate is varied continuously between a lower and an upper limit. This may equally apply to either or both testing of a new unrestricted system or a system which may be restricted.

The apparatus may be configured to provide pressure zoning. For example, this may involve analysing a section of the deluge system by analysis of test results where the pressure at an upstream location is targeted which may be the pressure at the same location for the deluge system when it was unrestricted/clean.

Beneficially, this pressure zoning simplifies the analysis of deluge system test.

The sensor arrangement may comprise one or more sensors located at junction or intersections of the pipe network of the water deluge system. This may facilitate the pressure zoning described above.

According to a second aspect, there is provided a water deluge system comprising the apparatus of the first aspect.

The water deluge system comprises a dry side and a wet side separated by a deluge valve, the dry side of the water deluge system having a network of pipes and outlets which are maintained in an open condition.

The water deluge system may comprise a plurality of outlets. The outlet or outlets of the water deluge system may comprise or take the form of nozzles.

According to a third aspect, there is provided a facility comprising the water deluge system of the second aspect.

According to a fourth aspect, there is provided a method of testing a water deluge system, comprising:

- providing a supply of pressurised air through a water deluge system using a blower coupled to the water deluge system;
- measuring the pressure of the air at one or more outlets of the water deluge system and outputting an output signal indicative of the pressure of the air at the one or more outlets;
- conveying the output signal to a processing system configured to determine from said one or more output signals the flow rate of the air supply at the one or more outlets.

The method may comprise determining a condition of the water deluge system from the output signals from the outlets.

The method may comprise measuring the flow rate of the air at an inlet, e.g. an input valve, of the water deluge system. The method may comprise outputting an output signal indicative of the flow rate of air at the inlet. The method may comprise conveying the output signal to the processing system.

The method may comprise comparing the output signal indicative of the flow rate of air at the inlet with the output signal(s) from the outlets.

The method may comprise determining a condition of the water deluge system from the compared output signals from the inlet and outlets.

The method may comprise determining a condition of the water deluge system by comparing the determined flow rate of the air at the one or more outlets to a reference signal. The reference signal may take the form of the flow rate of the air in the deluge system when the deluge system was commissioned or otherwise known to be free from obstructions.

The method may comprise coupling the apparatus of the first aspect to the water deluge system. For example, the method may comprise coupling the blower to the dry side of the water deluge system.

The method may comprise coupling the sensor arrangement to the water deluge system.

The method may comprise coupling sensors to a selected subset of the outlets of the water deluge system.

The method may comprise logging or recording the subset of locations.

The test period may be between 5 seconds and 120 seconds. For example, the test period may be between 15 seconds and 60 seconds. In particular embodiments, the test period may be 30 seconds.

The method may comprise comparing the results of the test with a previous wet test.

The method may comprise subsequently performing a wet test.

The method may comprise comparing the results of the test with the subsequent wet test.

According to a fifth aspect, there is provided a method, comprising:

- performing the test method of the fourth aspect at a first time period to provide a first test data set indicative of the condition of the water deluge system;
- performing the test method of the fourth aspect or a wet test at a second time period to provide a second test data set indicative of the condition of the water deluge system; and
- outputting the first data set and the second data set.

The method may comprise performing a comparison of the first data set and the second data to determine a condition of the water deluge system.

Beneficially, the method permits the condition of the water deluge system to be monitored.

According to a sixth aspect, there is provided an apparatus for testing a fire suppression system. The fire suppression system may comprise or take the form of a nitrogen fire suppression system.

The apparatus may comprise a blower configured for coupling to an inlet of the fire suppression system. The blower may be configured to provide a supply of pressurised gas, e.g. air, through the fire suppression system from the inlet to one or more outlet of the fire suppression system.

The apparatus may comprise, may be coupled to, or operatively associated with a gas source. The gas source may comprise a high pressure gas source, such as one or more compressed gas bottle.

The apparatus may comprise a regulator. The regulator may be configured to lower the gas pressure to the operating pressure of the fire suppression system.

The apparatus may comprise a sensor arrangement.

The sensor arrangement may comprise one or more sensor configured to measure the flow of the gas at the inlet. The one or more sensor may comprise or take the form of a flow meter.

In use, the sensor may be configured to measure the gas flow rate at the operating gas pressure.

Beneficially, the apparatus provides flow assurance for a fire suppression system, e.g. a nitrogen fire suppression system, at operating conditions.

Features of the first to fifth aspects may be utilised in the apparatus according to the sixth aspect, and vice-versa.

According to a seventh aspect, there is provided a fire suppression system comprising the apparatus of the sixth aspect.

The fire suppression system may comprise or take the form of a nitrogen fire suppression system.

According to an eighth aspect, there is provided a facility comprising the fire suppression system of the seventh aspect.

According to a ninth aspect, there is provided a method of testing a fire suppression system.

The method may comprise providing a supply of pressurised gas, e.g. air, through a fire suppression system using a blower coupled to the fire suppression system.

The supply of pressurised gas may be supplied from a gas source. The gas source may comprise a high pressure gas source, such as one or more compressed gas bottle.

The method may comprise lowering the pressure of the gas, e.g. to the operating pressure of the fire suppression system.

The method may comprise measure the flow of the gas at the inlet.

Features of the first to eighth aspects may be utilised in the method according to the ninth aspect, and vice-versa.

According to a tenth aspect, there is provided a method, comprising:

performing the test method of the ninth aspect at a first time period to provide a first test data set indicative of the condition of the fire suppression system;

performing the test method of the ninth aspect or an inert gas test at a second time period to provide a second test data set indicative of the condition of the fire suppression system; and outputting the first data set and the second data set.

According to another aspect, there is provided a processing system configured to implement one or more of the previous aspects.

The processing system may comprise at least one processor. The processing system may comprise and/or be configured to access at least one data store or memory. The data store or memory may comprise or be configured to receive operating instructions or a program specifying operations of the at least one processor. The at least one processor may be configured to process and implement the operating instructions or program.

The at least one data store may comprise, and/or comprise a reader, drive or other means configured to access, optical storage or disk such as a CD or DVD, flash drive, SD device, one or more memory chips such as DRAMs, a network attached drive (NAD), cloud storage, magnetic storage such as tape or magnetic disk or a hard-drive, and/or the like.

The processing system may comprise a network or interface module. The network or interface module may be connected or connectable to a network connection or data carrier, which may comprise a wired or wireless network connection or data carrier, such as a data cable, powerline data carrier, Wi-Fi, Bluetooth, Zigbee, internet connection or other similar connection. The network interface may comprise a router, modem, gateway and/or the like. The system or processing system may be configured to transmit or otherwise provide the audio signal via the network or interface module, for example over the internet, intranet, network or cloud.

The processing system may comprise a processing apparatus or a plurality of processing apparatus. Each processing apparatus may comprise at least a processor and optionally a memory or data store and/or a network or interface module. The plurality of processing apparatus may communicate via respective network or interface modules. The plurality of processing apparatus may form, comprise or be comprised in a distributed or server/client based processing system.

According to another aspect, there is provided a computer program product configured such that when processed by a suitable processing system configures the processing system to implement one or more of the previous aspects.

The computer program product may be provided on or comprised in a carrier medium. The carrier medium may be transient or non-transient. The carrier medium may be tangible or non-tangible. The carrier medium may comprise a signal such as an electromagnetic or electronic signal. The carrier medium may comprise a physical medium, such as a disk, a memory card, a memory, and/or the like.

According to another aspect, there is provided a carrier medium, the carrier medium comprising a signal, the signal when processed by a suitable processing system causes the processing system to implement one or more of the previous aspects.

It will be well understood by persons of ordinary skill in the art that whilst some embodiments may implement certain functionality by means of a computer program having computer-readable instructions that are executable to perform the method of the embodiments. The computer program functionality could be implemented in hardware (for example by means of a CPU or by one or more ASICs (application specific integrated circuits)) or by a mix of hardware and software.

Whilst particular pieces of apparatus have been described herein, in alternative embodiments, functionality of one or more of those pieces of apparatus can be provided by a single unit, processing resource or other component, or functionality provided by a single unit can be provided by two or more units or other components in combination. For example, one or more functions of the processing system may be performed by a single processing device, such as a personal computer or the like, or one or more or each function may be performed in a distributed manner by a plurality of processing devices, which may be locally connected or remotely distributed.

The invention is defined by the appended claims. However, for the purposes of the present disclosure it will be understood that any of the features defined above or described below may be utilised in isolation or in combination. For example, features described above in relation to one of the above aspects or below in relation to the detailed description below may be utilised in any other aspect, or together form a new aspect.

BRIEF DESCRIPTION OF THE DRAWINGS

These and other aspects will now be described, by way of example only, with reference to the accompanying drawings, in which.

DETAILED DESCRIPTION OF THE DRAWINGS

Figure 1:
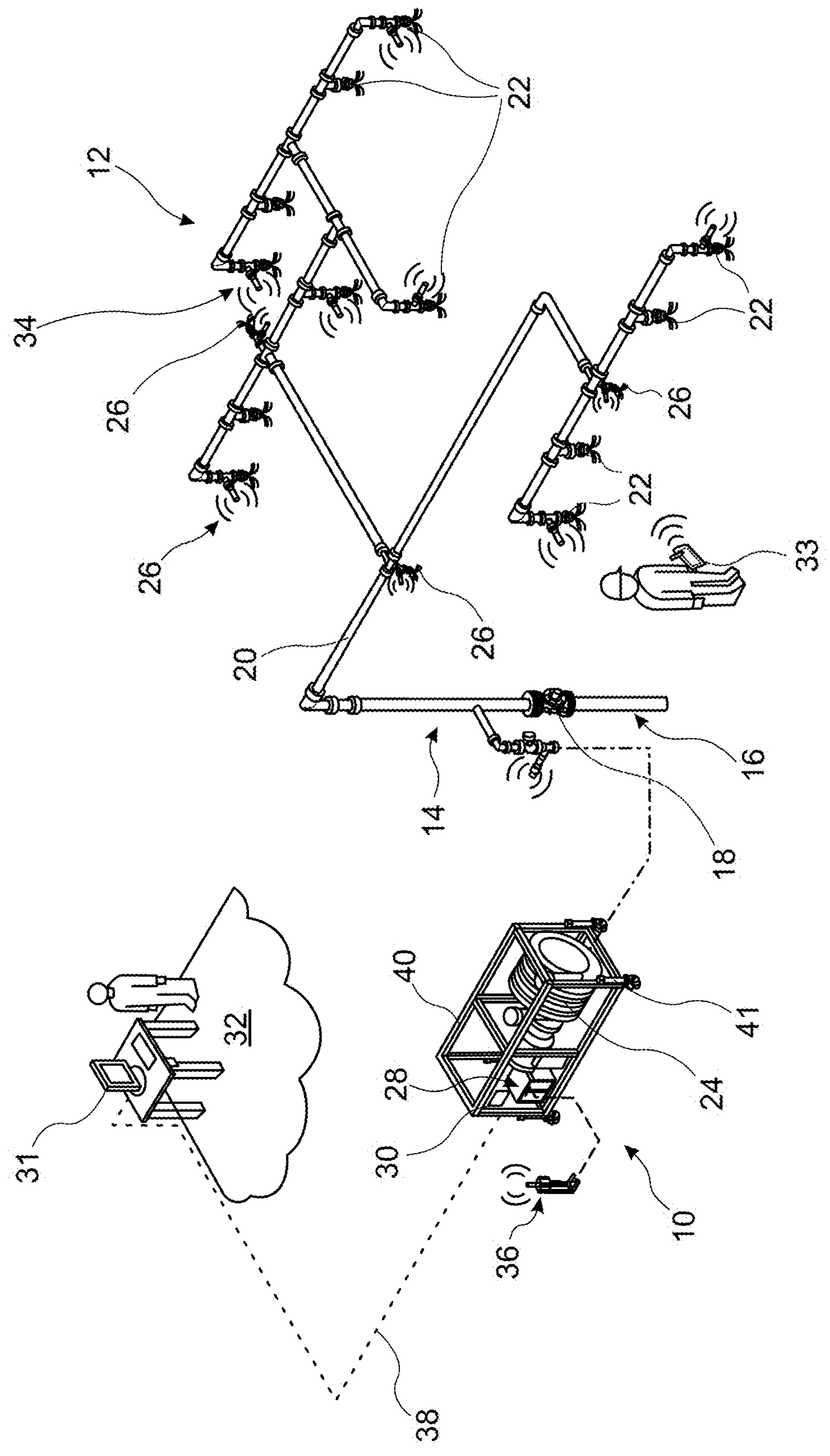
FIG. 1 shows a diagrammatic view of an apparatus for testing a water deluge system.

Referring first to FIG. 1 of the accompanying drawings, there is shown an apparatus 10 for testing a water deluge system 12. As shown in FIG. 1, the water deluge system 12 comprises a dry side 14 and a wet side 16 separated by deluge valve 18. The dry side 14 includes a pipe network 20 and a number of outlets 22, which in the illustrated water deluge system 12 take the form of discharge nozzles.

Figure 2:
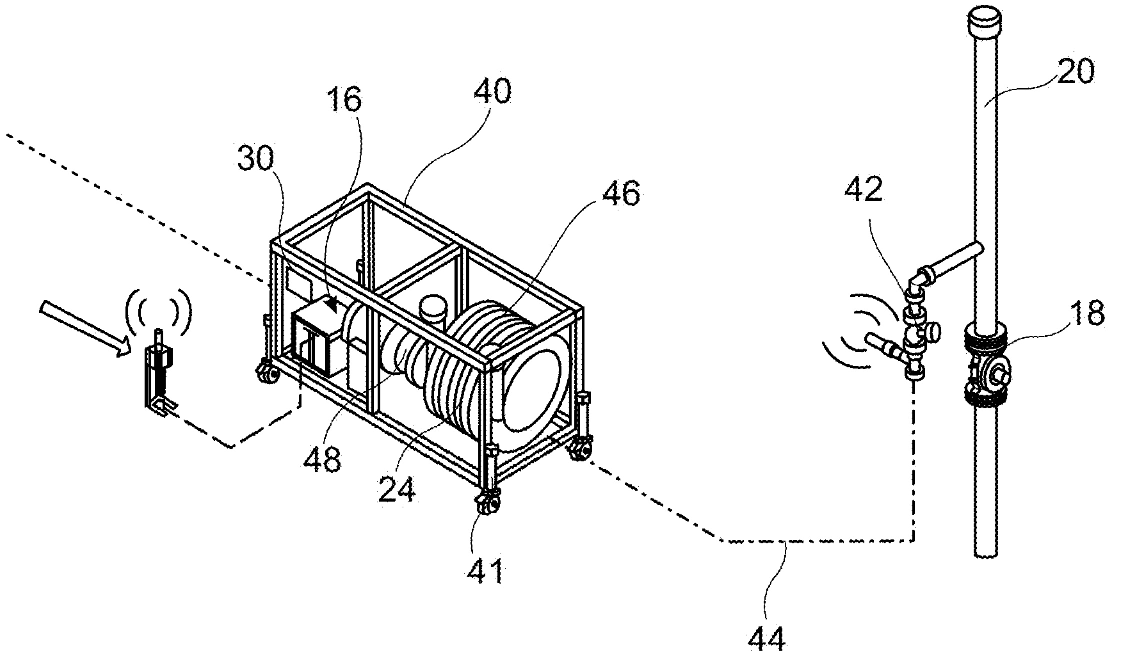
FIG. 2 shows an enlarged view of part of the apparatus shown in FIG. 1.
Figure 3:
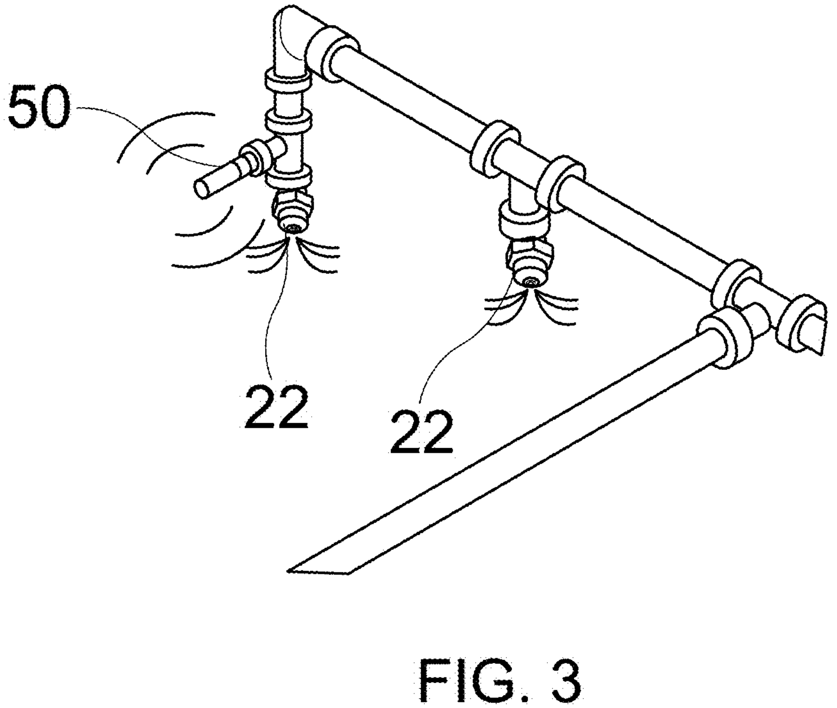
FIG. 3 shows an enlarged view of another part of the apparatus shown in FIG. 1.

Referring now also to FIG. 2 of the accompanying drawings, the apparatus 10 comprises a blower 24, a sensor arrangement, generally denoted 26, and a digital acquisition (DAQ) module 28 which communicates with a control console 30. The control console 30 in turn communicates with a console 31 in control room 32. In the illustrated apparatus 10, the control console 30 is integral to the apparatus 10. However, it will be understood that the control console 30 may alternatively be remote from the apparatus 10. As an alternative to or in addition to the console 30, the apparatus 10 may comprise a mobile device 33 which communicates with one or more of the control console 30, the control console 31, sensor arrangement 26 or other components of the apparatus 10. In the illustrated apparatus 10, the mobile device 33 takes the form of a tablet. However, it will be recognised that the mobile device 33 may alternatively comprise any suitable mobile device such as a mobile telephone or the like. In use, the apparatus 10 may, for example, relay information relating the deluge system 12, the dry test process or recommended remedial actions to a user via the mobile device 33. The apparatus 10 further comprises a wireless communication arrangement, which is represented in FIG. 1 by arrows 34.

In use, and as will be described further below, the blower 24 is operable to provide a supply of air at higher pressure than atmospheric pressure into and through the water deluge system 12, the sensor arrangement 26 operable to measure the pressure of the air at the outlets 22 of the water deluge system 12 and output an output signal indicative of the pressure of the air at the associated outlet 22, which is then communicated wirelessly by communication arrangement 34 to the data acquisition device 28 via wireless receiver 36. The data acquisition device 28 communicates with console 31, in the illustrated apparatus 10 by optic line 38, although it will be recognised that any suitable means may be utilised to communicate with the console 31.

The ability of the apparatus 10 to carry out a test of the water deluge system 12 without the requirement for a wet test has a number of significant benefits. For example, the apparatus 10 obviates the time, expense, and inconvenience involved in preparing for the wet test, such as arranging receptacles to collect dispensed water from the water deluge system 12 and in bagging sensitive equipment, as well as the time, expense, inconvenience and inaccuracies involved in performing the wet test. Personnel are also not exposed to water flow and are thus unimpeded in carrying out their duties. The ability of the apparatus 10 to carry out a test of the water deluge system 12 without the requirement for a wet test also reduces the risk of corrosion.

As shown in FIGS. 1 and 2, the blower 24 is disposed on a movable skid 40 having wheels 41 and is coupled to an inlet valve 42 via a fluid conduit 44. In the illustrated apparatus 10, the blower 24 comprises a pump 46 in the form of multi-stage centrifugal pump and a motor 48.

In use, the blower 24 is configured to intake air at atmospheric pressure and provide an exhaust air supply to the water deluge system 12 at higher air pressure than atmospheric pressure.

Beneficially, the blower 24 is capable of directing a flow of air at high flow and relatively low gauge pressure, i.e., higher pressure than atmospheric pressure but lower than high pressure air systems, into and through the water deluge system 12, and thus obviates or at least reduces the requirement for a gas source such as an accumulator, an air receiver such as a bank of compressed air cylinders and/or a pressure regulator skid.

The blower 24 occupies a relatively small footprint in comparison to conventional test apparatus. This is particularly beneficial in offshore installations, such as platform, rigs and the like, due to the size and weight limitations for transportation to/from the installation and/or where deck space is typically limited and which may prevent conventional test equipment from being installed on a permanent basis.

As described above, the apparatus 10 comprises a sensor arrangement 26 operable to measure the pressure of the air at the outlets 22 of the water deluge system 12 and output an output signal indicative of the pressure of the air at the associated outlet 22.

As shown in FIG. 1 and referring now also to FIGS. 3, 4, 5 and 6 of the accompanying drawings, the sensor arrangement 26 comprises a number of sensors 50 coupled to an associated subset of the outlets 22 of the water deluge system 12, the sensor arrangement 26 configured to measure the pressure of the air at the outlet of the water deluge system 12 and output an output signal indicative of the pressure of the air at the outlet 22 with which the sensor 50 is associated. While in the illustrated apparatus 10 sensors 50 are provided at a selected subset of outlets 22, the apparatus 10 may alternatively comprise sensors 50 at every outlet 22.

Figure 4:
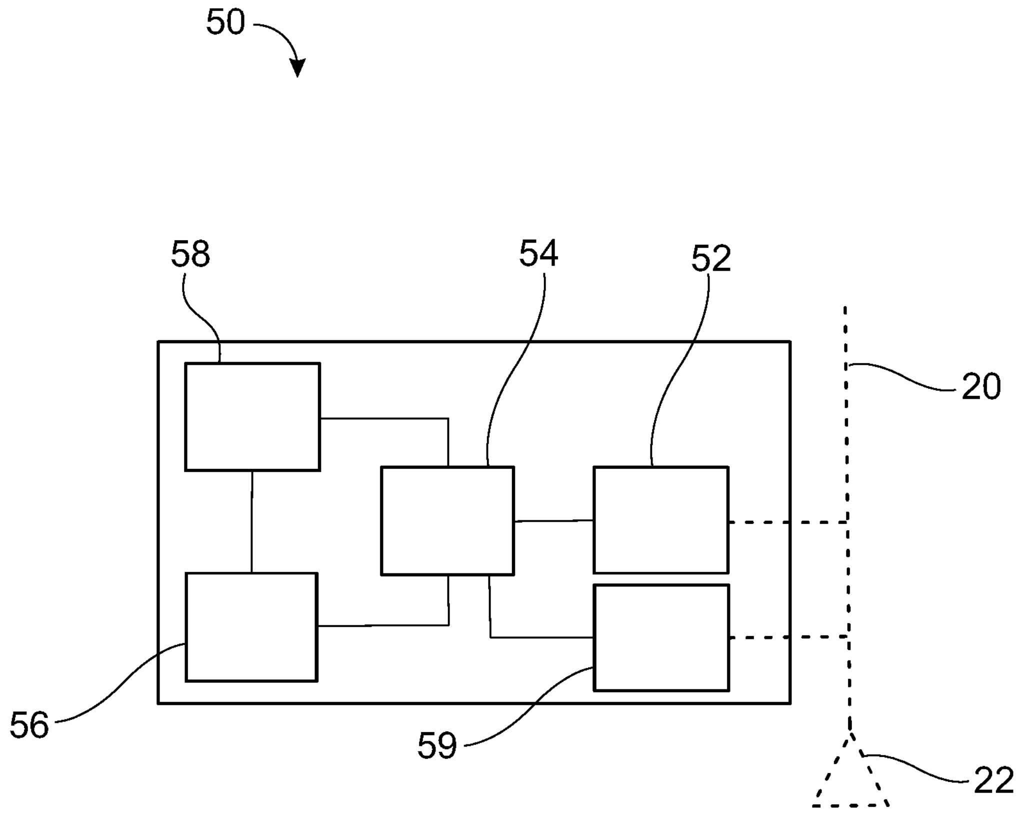
FIGS. 4, 5 and 6 show a sensor of the sensor arrangement of the apparatus shown in FIG. 3.
Figure 5:
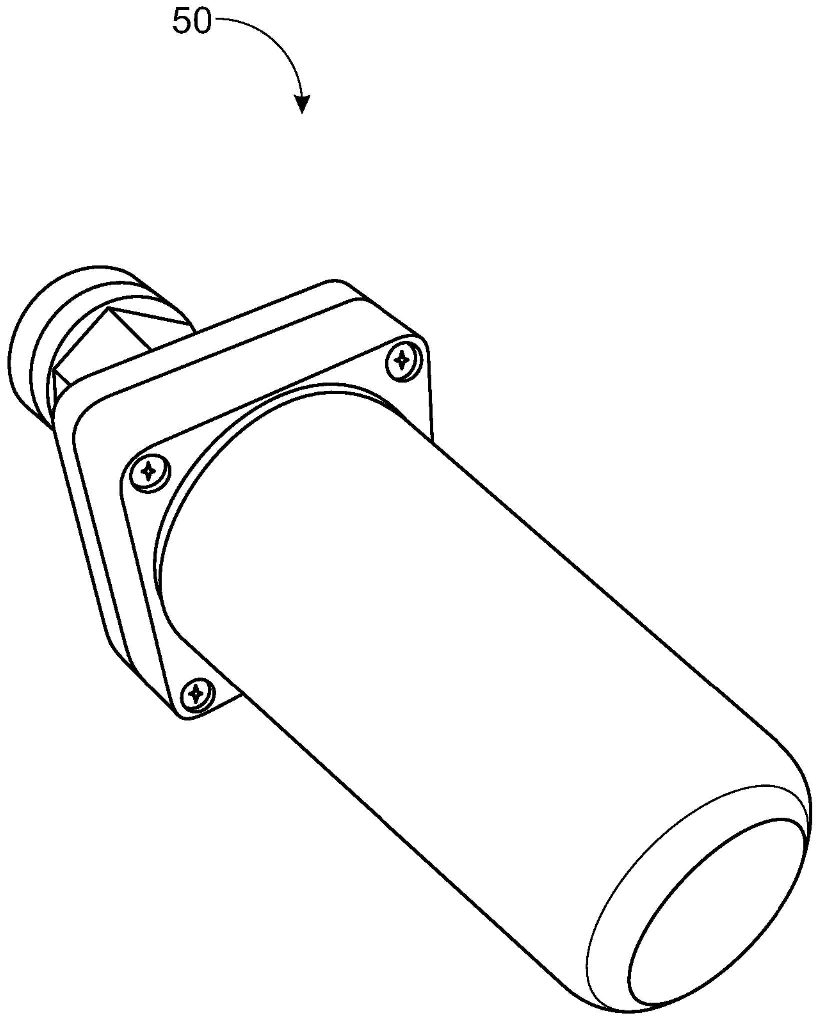
Figure 6:
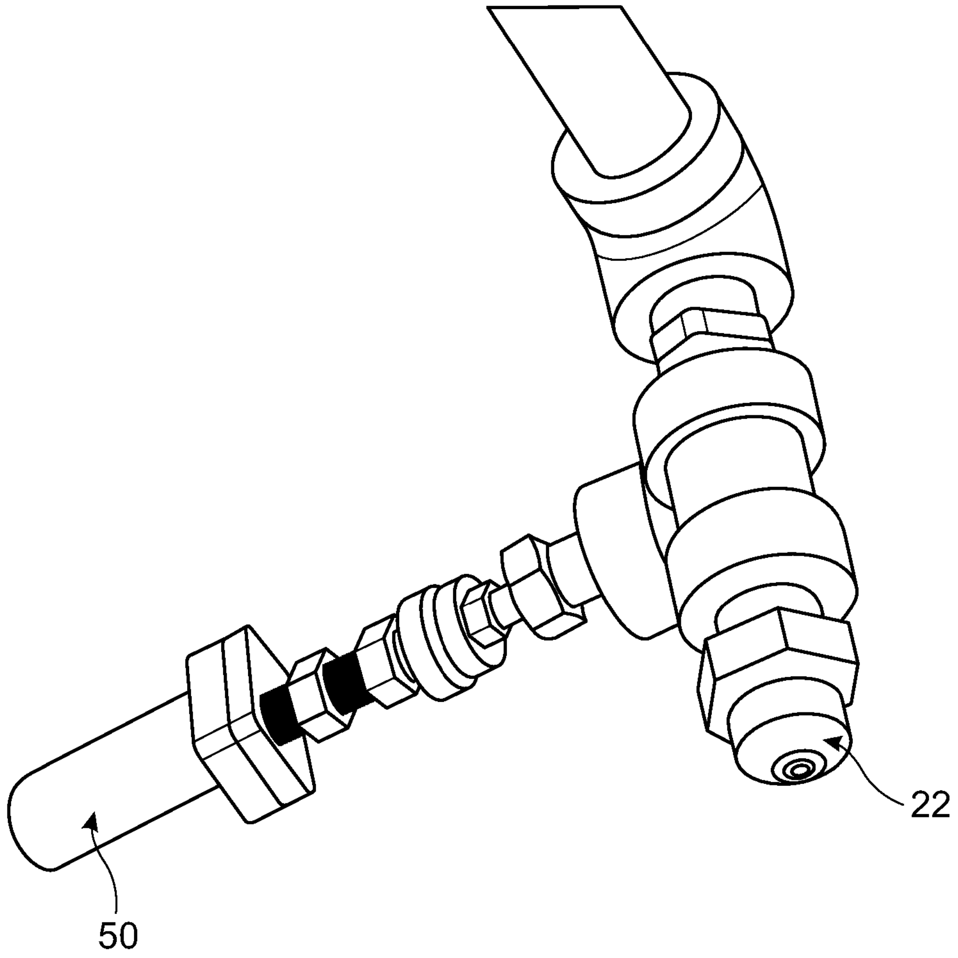

As shown in FIG. 4, the sensor 50 comprises a pressure sensor 52, a sensor control module 54, a rechargeable battery 56 and a wireless communications transceiver 58. The pressure sensor 52 is configured to measure the pressure of air at the outlet 22 which is communicated wirelessly to the data acquisition device 28 by transceiver 58. The sensor control module 54 amongst other control functions may control whether the sensor 50 should be in an awake state or a sleep state. The illustrated sensor 50 further comprises a temperature sensor 59 for the sensor measuring temperature and this data may also be transmitted and used by the apparatus 10 for beneficial analysis purposes, for example the calculation of the dew point temperature of the air at the sensor 50.

Figure 7:
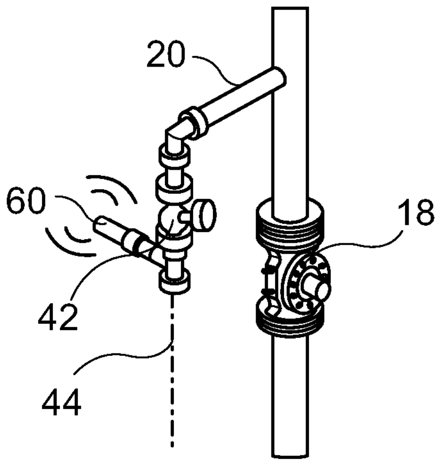
FIG. 7 shows an enlarged view of another part of the apparatus shown in FIG. 1.
Figure 8:
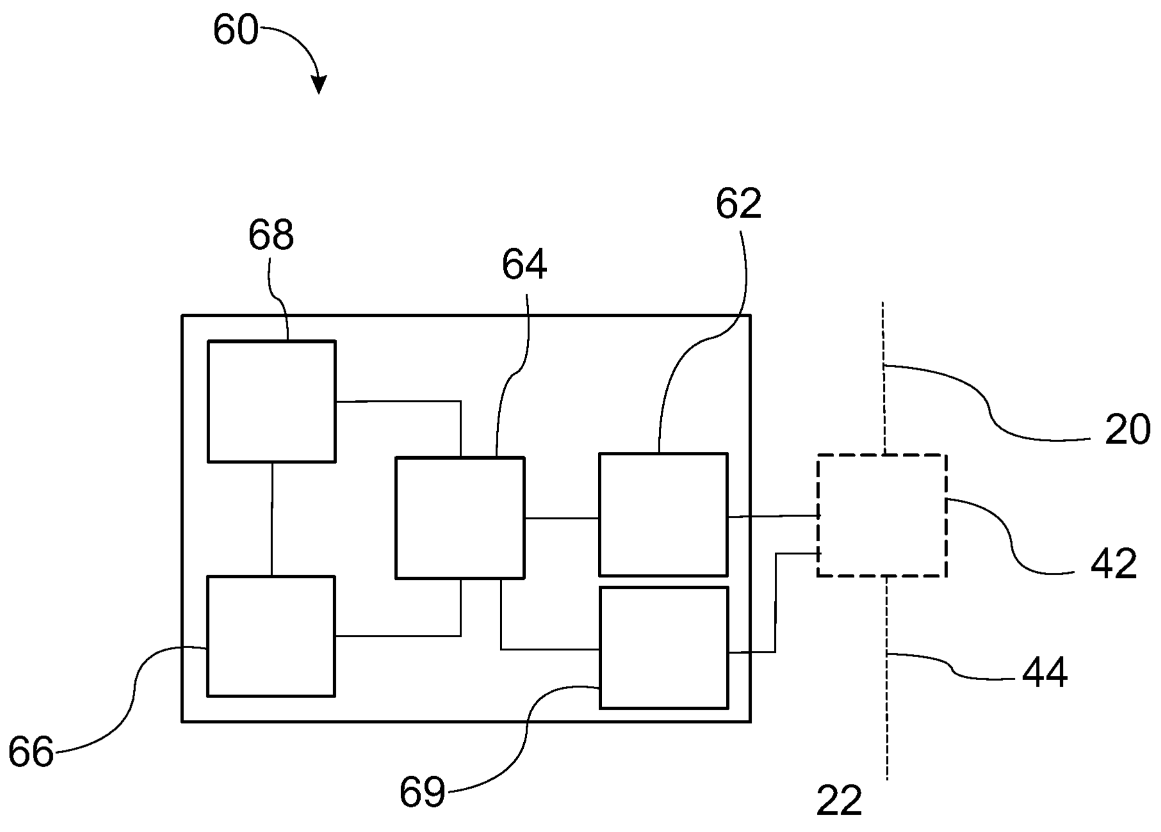
FIG. 8 shows a schematic view of another sensor of the sensor arrangement of the apparatus shown in FIG. 1.

As shown in FIG. 1, and referring now also to FIGS. 7 and 8 of the accompanying drawings, the sensor arrangement 26 further comprises a sensor 60 coupled to the inlet valve 42 of the water deluge system 12, the sensor 60 operable to measure the pressure of the air at the inlet valve 42 of the water deluge system 12 and output an output signal indicative of the pressure of the air at the inlet valve 42.

As shown in FIG. 8, the sensor 60 comprises a pressure sensor 62, a sensor control module 64, a rechargeable battery 66 and a wireless communications transceiver 68. The pressure sensor 62 is configured to measure the pressure of the air at the inlet valve 42 of the water deluge system 12 which is communicated wirelessly to the data acquisition device 28 by transceiver 68. The sensor control module 64 amongst other control functions may control whether the sensor 60 should be in an awake state or a sleep state. The illustrated sensor 60 further comprises a temperature sensor 69 for the sensor measuring temperature and this data may also be transmitted and used by the apparatus 10 for beneficial analysis purposes, for example the calculation of the dew point temperature of the air at the sensor 50.

The transceivers 58, 68, together with the wireless receiver 36 form the communication arrangement 34 of the apparatus 10, the communication arrangement 34 configured to convey the output signal indicative of the pressure of the air at the outlets 22 and/or inlet valve 42 to the data acquisition device 28.

When it is desired to carry out the test, the blower 24 is activated to provide a supply of air at higher pressure than atmospheric pressure into and through the dry side 14 of the water deluge system 12 over a test period. As the blower 24 in the illustrated apparatus 10 comprises a multi-stage centrifugal pump 24, the blower 24 is capable of supplying air at high flow rate. As the air is at a higher pressure than the air at atmospheric pressure present within the open dry side 14 of the water deluge system 12 the air flows through the pipe network 20 to the outlets 22 where it exits the system 12. The sensor 60 is configured to measure the measure the pressure of the air at the inlet valve 42 of the water deluge system 12 which is communicated wirelessly to the data acquisition device 28 by transceiver 68.

As the air exits the outlets 22, the pressure of the air is measured by the sensors 50 disposed at the selected subset of the outlets 22, although as noted above in some instances all of the outlets 22 may be provided with a sensor 50.

The transceivers 58 of the sensors 50 are then operable to transmit an output signal to the data acquisition device 28 via the wireless receiver 36, which in turn is communicated to the console 30 via the optic line 38.

The method may then comprise determining a condition of the water deluge system 12 from the acquired data. This may involve comparing the data at the inlet valve 42 with the data measured at the outlets 22. Alternatively, or additionally, the air pressure data measured at the outlets 22 may be compared with a previous test using the apparatus 10 or with previous wet test data. In this way, the condition of the water deluge system may also be monitored over time, either periodically or on a continuous basis in a manner not previously possible.

As described above, the ability of the apparatus 10 to carry out a test of the water deluge system 12 without the requirement for a wet test has a number of significant benefits. For example, the apparatus obviates the time, expense, and inconvenience involved in preparing for the wet test, such as arranging receptacles to collect dispensed water from the water deluge system 12 and in bagging sensitive equipment, as well as the time, expense, inconvenience and inaccuracies involved in performing the wet test. Personnel are also not exposed to water flow and are thus unimpeded in carrying out their duties. The ability of the apparatus 10 to carry out a test of the water deluge system 12 without the requirement for a wet test also reduces the risk of corrosion in the water deluge system 12 and elsewhere in the installation.

Moreover, the apparatus 10 occupies a relatively small footprint on the installation. This is particularly beneficial on offshore oil and gas installations, such as a platform or rig, in which deck space is typically limited and which may prevent conventional test equipment from being installed on a permanent basis.

Figure 9:
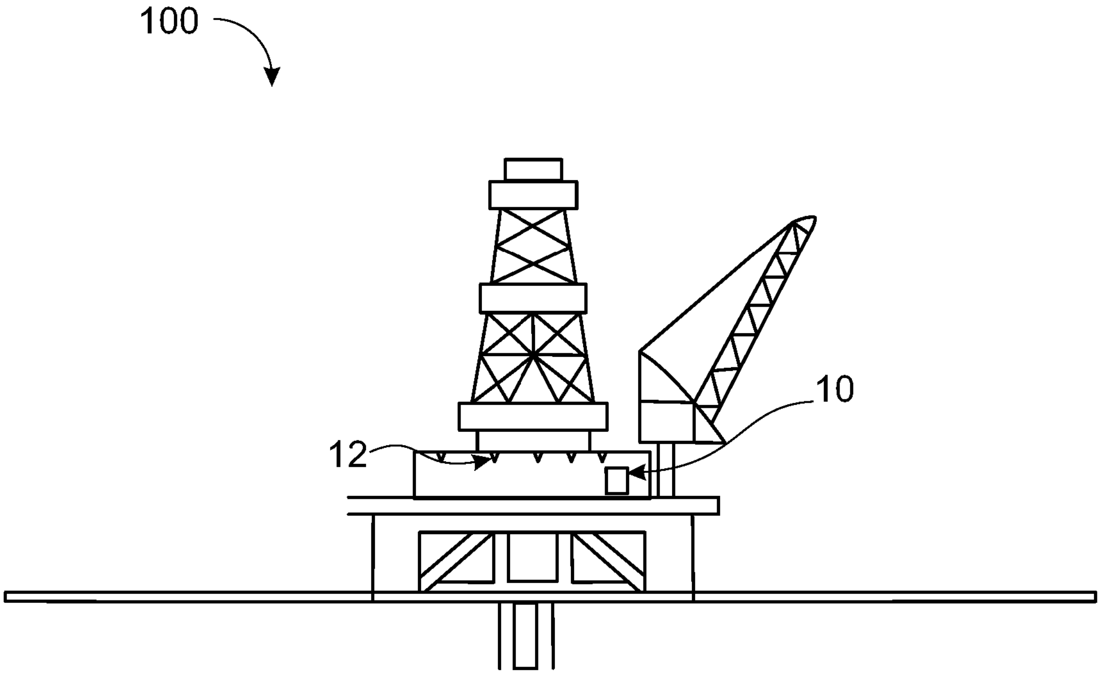
FIG. 9 shows a facility including the apparatus shown in FIG. 1.
Figure 10:
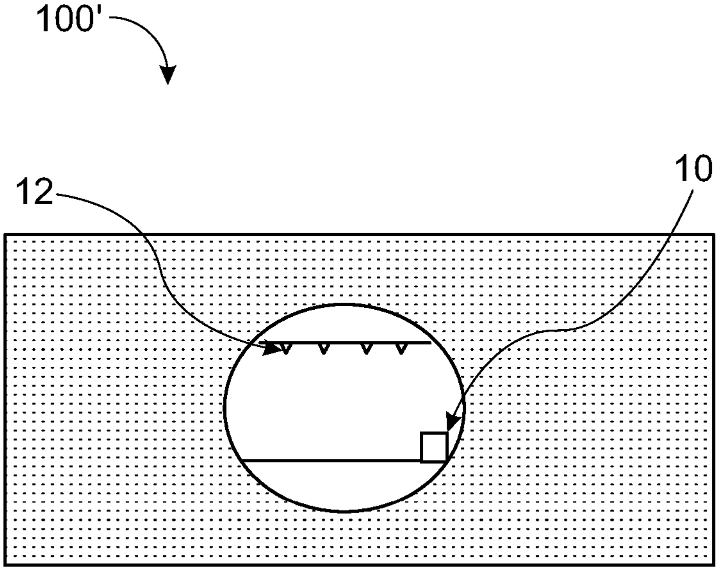
FIG. 10 show another facility including the apparatus shown in FIG. 1.

It will be recognised that the apparatus 10 may be utilised in a variety of different facilities, but is particularly beneficial in offshore facilities. For example, FIGS. 9 and 10 show facilities 100,100' including the water deluge system 12 and the apparatus 10 (the system 12 and apparatus 10 are of course not shown to scale). In FIG. 9, the facility 100 takes the form of an offshore platform. In FIG. 10, the facility 100' takes the form of a tunnel.

A sample calculation explaining how water flow rate can be determined by measurement of air pressure is explained for a simplified system below. For incompressible flow the pressure drop in a pipe is typically given by the Darcy Weisbach equation. The present tests are performed at very low pressure, typically with nozzle outlet pressures of less than 0.1 bar above atmospheric pressure. At these low pressures the Mach number is very low e.g. less than 0.1. At very low Mach numbers the air can be said to be in an incompressible flow regime. In reality there is compression, but the difference between using more complex compressible flow calculations and incompressible flow calculations is less than 1% error. Therefore incompressible flow calculations can used to simplify analysis.

Consider a simple pipe with a nozzle at its end. The pressure loss across this pipe is calculated by:

$$\Delta P_{AB} = \frac{4 \times ff \times L}{d} \times \frac{1}{2} \times \rho \times \mu^2$$

Where:

L=Length of Pipe

D=Diameter of Pipe

μ=Velocity of fluid

ρ=Density of Fluid ff=friction factor of pipe

To determine the ratio between water pressure loss and air pressure loss constants can be removed $$\Delta P_{AB} = \rho \times \mu^2$$

Therefore giving $$\frac{\Delta P_{AB\ Water}}{\Delta P_{AB\ Air}} = \frac{\rho_{Water} \times \mu_{Water} 2}{\rho_{Water} \times \mu_{Air} 2}$$

Typically seawater is used for deluge testing therefore:

$$P_{Water} = 1027\ \text{kg/m3}$$

$$P_{Air} = 1.225\ \text{kg/m3}$$

$\mu_{Water}$=6 m/sec (typically fire systems are design to avoid flow velocities higher than 6 m/sec $\mu_{Air}$=25 m/sec (equivalent air velocity for dry-flo testing)

Therefore:

$$\frac{\Delta P_{AB\ Water}}{\Delta P_{AB\ Air}} = \sim 50$$

The following is a simplified demonstration of the comparison between air and water pressure losses.

| Condition | Pressure at A (bar) | Pressure loss through pipe (bar) | Pressure at B (bar) |
|---|---|---|---|
| Initial Wet Test/ Hydraulic Simulation (Example Values) | 2 | 0.2 | 1.8 |
| Master Dry Test (Example Values) | 0.04 | 0.004 | 0.036 |

An initial wet test is performed to commission the system 12. During this time the density application rate is verified and spray pattern verified as fit for purpose. Typically testing is performed against the expected outputs from a hydraulic modelling package.

Once the system 12 has been verified and the pressure losses in water determined for the pipe network, a dry test using the apparatus 10 is performed which then determines the losses in air, this is known as the Master signature.

After a period of time, for example 1 year, a further dry test using the apparatus 10 is performed, however now there is debris built up within the line (e.g. a spurious release swept marine debris into the pipework).

With the same inlet pressure at A the pressure losses are higher due to the restriction within the line leading to a lower outlet pressure.

| Condition | Pressure at A (bar) | Pressure loss through pipe (bar) | Pressure at B (bar) |
|---|---|---|---|
| Second Dry-flow Test (Example values) | 0.04 | 0.028 | 0.012 |

The pressure at B for the same inlet pressure at A would now be:

$$\Delta P_{AB\ Water} = \sim 50 \times P_{AB\ Air}$$

$$\Delta P_{AB\ Water} = \sim 50 \times 0.012 = 0.6 \text{ bar}$$

If the nozzle at B had a typical K factor of 25 the flow rate at B during initial test was:

$$Q\left(\frac{\text{litres}}{\text{min}}\right) = 23\sqrt{P_{B\ Water}}$$

$$Q\left(\frac{\text{litres}}{\text{min}}\right) = 23\sqrt{1.8} = 30 \text{ L/min}$$

But is now $$Q\left(\frac{\text{litres}}{\text{min}}\right) = 23\sqrt{0.6} = 17 \text{ L/min}$$

Accordingly, the above allows the condition of the deluge system to verified.

An example of a test regime employing the apparatus is described below.

On first application, a wet test and/or an inspection is carried out to the deluge system 12 to determine whether the deluge system 12 is in good condition, to determine whether the nozzles are seeing the correct pressures, to determine how long it takes for the most remote nozzle to reach the desired pressure, to determine whether the spray pattern is correct, and to determine whether the flow in $L/m^2$/min. The drains (not shown) may also be checked to ensure they are functioning correctly.

The pressure at the inlet and outlet nozzles to which the sensor arrangement 26 of the apparatus 10 is measured.

The apparatus 10 is operated to remove the water by blowing at maximum rate, for example for 5 minutes to 20 minutes depending on the size of the deluge system 12.

The blower 24 slowly sweeps up through flow until it reaches maximum pressure. The sensor arrangement 26 monitors the pressure and the communication arrangement relays the detected pressure data to the processing system, control station and/or data store. This forms a master signature for the system 12.

The apparatus 10 is operable to check for problems in the pipework or nozzles by breaking the system 12 down into sections. By breaking the system 12 into distinct sections, the apparatus creates a priority list for operators if problems are found depending on the severity of a given restriction.

It will be recognised that the inlet pressure recorded during the master signature ramp is a unique property of a clean system. Thus, if a new signature pressure response is matched to the master signature then there are no restrictions.

The pressure output of the blower 24 is then reduced so that the blower 24 enters the incompressible flow regime. The apparatus 10 is then operated and the flow for the particular test determined as described above.

The airflow requirement for testing will change for different systems, however for an example 12 nozzle system it is estimated that approximately 200 $ft^3$/min compressed air will be required at 0.25 Bar at the nozzles.

The pressure loss through the nozzles will be approximately $\frac{1}{2}\cdot\rho\cdot U^2$ regardless of the fluid (assuming incompressible fluids).

Hence, for the same pressure drop in both fluids, $(\frac{1}{2}\cdot\rho\cdot U^2)_w = (\frac{1}{2}\cdot\rho\cdot U^2)$ a where w=water and a=air.

$$\text{Hence } U_a / U_w \approx (1000/1.2)^{1/2} \approx 29 \; [U = \text{velocity}]$$

$$\text{Hence } V_a / V_w \approx (1000/1.2)^{1/2} \approx 29 \; [V = \text{volumetric flow rate}]$$

The nozzles are designed for a supply of 285 l/min of water with a pressure drop of 0.5 bar. This implies 202 l/min for water with a pressure drop of 0.25 bar, and therefore about 5860 l/min air for a pressure drop of 0.25 bar 5860 in ≈5.86 $m^3$/min≈200 $ft^3$/min @0.25 bar Whilst this estimate will allow for planning, each system will be fully simulated on software to understand what the expected air pressure at each nozzle will be for a fully compliant system.

It will be further recognised that the apparatus described above is merely exemplary and that various modifications may be made without departing from the scope of the claimed invention.

Figure 11:
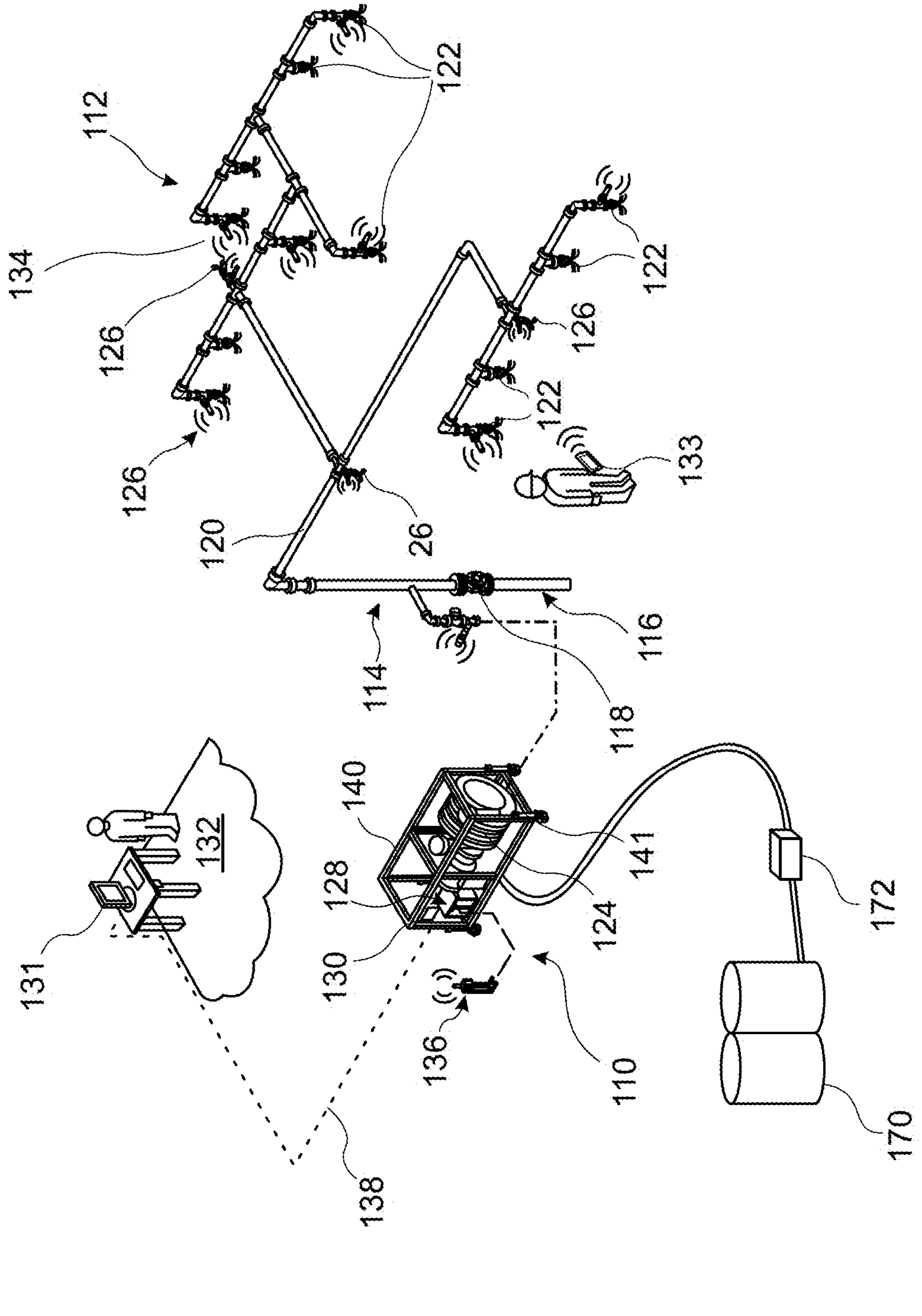
FIG. 11 shows a diagrammatic view of an apparatus for testing a fire suppression system.
Figure 12:
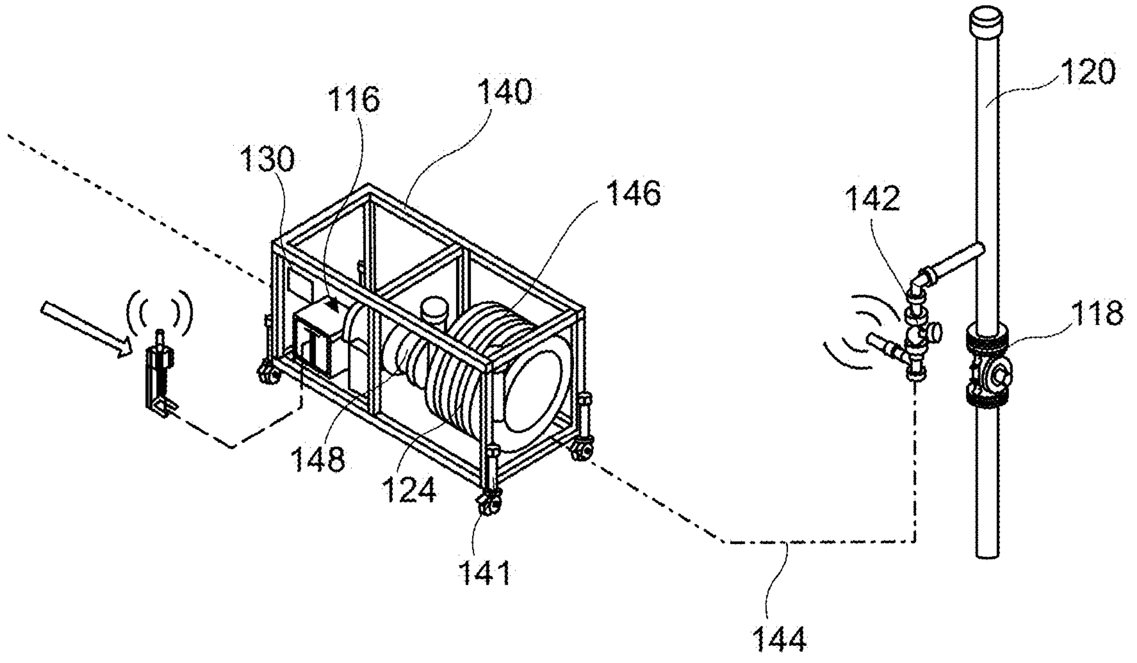
FIG. 12 shows an enlarged view of part of the apparatus shown in FIG. 11.

For example, FIGS. 11 and 12 of the accompanying drawings show an alternative apparatus 110. The apparatus 110 is similar to the apparatus 10 described above and like components are represented by like reference signs incremented by 100.

While the apparatus 10 is described above with respect to a water deluge system 12, the apparatus 110 is configured to perform a test and/or flow assurance on a fire suppression system 112 which utilises inert gas fire suppression. The illustrated system 112 takes the form of a nitrogen gas fire suppression system.

As shown in FIGS. 11 and 12, the fire suppression system 112 comprises pipe network 120 and a number of outlets 122, which in the illustrated system 112 take the form of discharge nozzles. The apparatus 110 comprises a blower 124, a sensor arrangement, generally denoted 126, and a digital acquisition (DAQ) module 128 which communicates with a control console 130. The control console 130 in turn communicates with a console 131 in control room 132. In the illustrated apparatus 110, the control console 130 is integral to the apparatus 110. However, it will be understood that the control console 130 may alternatively be remote from the apparatus 110. As an alternative to or in addition to the console 130, the apparatus 110 may comprise a mobile device 133 which communicates with one or more of the control console 130, the control console 131, sensor arrangement 126 or other components of the apparatus 110. In the illustrated apparatus 110, the mobile device 133 takes the form of a tablet. However, it will be recognised that the mobile device 133 may alternatively comprise any suitable mobile device such as a mobile telephone or the like. In use, the apparatus 110 may, for example, relay information relating the system 12, the dry test process or recommended remedial actions to a user via the mobile device 133. The apparatus 110 further comprises a wireless communication arrangement, which is represented in FIG. 10 by arrows 134.

The communication arrangement 134 communicates with the data acquisition device 128 via wireless receiver 136. The data acquisition device 128 communicates with console 131, in the illustrated apparatus 10 by optic line 138, although it will be recognised that any suitable means may be utilised to communicate with the console 131.

As shown in FIGS. 11 and 12, the blower 124 is disposed on a movable skid 140 having wheels 141 and is coupled to an inlet valve 142 via a fluid conduit 144. In the illustrated apparatus 110, the blower 124 comprises a pump 146 in the form of multi-stage centrifugal pump and a motor 148.

The apparatus 10 and methods described above in order to both find restrictions and/or provide flow assurance are applicable to the apparatus 110. However, the equivalent flow calculation cannot be used (extrapolation of flow rate for gas at low pressure to gas at high pressure). For this application, another flow assurance test may be performed. This comprises: coupling the apparatus 112 to a high pressure gas source 170 such as compressed gas bottles, lowering the gas pressure to the operating pressure of the gas suppression system using a regulator 172 and measuring the gas flow rate at the lower (by regulation) operating gas pressure. In this way final flow assurance at operating conditions for a gas suppression system 112 is provided, complimentary to the method(s) described above.

What is claimed is:

1. An apparatus for testing a fire suppression system, the apparatus comprising:

a blower configured for coupling to an inlet valve of the fire suppression system, the blower configured to provide a supply of pressurized air through the fire suppression system from the inlet valve to one or more outlets of the fire suppression system;

a sensor arrangement comprising:

at least one sensor configured for coupling to or operatively associated with one or more of the outlets of the fire suppression system, the at least one sensor of the sensor arrangement configured to measure the pressure of the air at the one or more outlets of the fire suppression system and output one or more output signals indicative of the pressure of the air at the one or more outlets;

at least one sensor configured for coupling to or operatively associated with the inlet valve to the fire suppression system, the at least one sensor configured to measure the pressure of the air at the inlet valve and output an output signal indicative of the pressure of the air at the inlet valve; and a communication arrangement configured to convey the one or more output signals from the sensor arrangement to a processing system configured to determine from said one or more output signals indicative of the pressure of the air at the one or more outlets and said output signal indicative of the pressure of the air at the inlet valve the flow rate of the supply of pressurized air at the one or more outlets.

2. The apparatus of claim 1, wherein the fire suppression system is a water deluge system having a wet side and a dry side separated by a valve.

3. The apparatus of claim 1, wherein the fire suppression system is an inert gas fire suppression system.

4. The apparatus of claim 3, wherein the fire suppression system comprises or takes the form of a nitrogen gas fire suppression system.

5. The apparatus of claim 1, wherein the apparatus comprises, is coupled to, or is operatively associated with, the processing system.

6. The apparatus of claim 5, wherein the processing system is configured to determine a condition of the fire suppression system by comparing the flow rate of the supply of pressurized air at the one or more outlets to a reference signal.

7. The apparatus of claim 1, wherein the blower comprises or takes the form of an electric blower.

8. The apparatus of claim 1, wherein the blower comprises, is coupled to, or is operatively associated with, a variable frequency drive (VFD).

9. The apparatus of claim 1, comprising at least one of:

an air conditioner configured to control the humidity of the air supply;

a moisture filter provided at an inlet of the blower.

10. The apparatus of claim 1, wherein the sensor arrangement comprises sensors coupled to or operatively associated with a subset of the outlets of the fire suppression system.

11. The apparatus of claim 1, wherein the sensor arrangement comprises sensors coupled to or operatively associated with all of the outlets of the fire suppression system.

12. The apparatus of claim 1, wherein the sensor arrangement comprises one or more temperature sensors coupled to or operatively associated with one or more of the outlets of the fire suppression system and configured to measure the temperature of the air at said one or more of the outlets.

13. The apparatus of claim 1, wherein at least one of the sensors of the sensor arrangement is configured to be removably coupled to the fire suppression system.

14. The apparatus of claim 1, wherein at least one of the sensors of the sensor arrangement is configured to be permanently coupled to the fire suppression system.

15. The apparatus of claim 1, wherein the at least one sensor coupled to or operatively associated with the inlet valve comprises at least one of:

one or more sensors configured to measure the flow of the air at the inlet valve;

one or more sensors configured to measure temperature at the inlet valve.

16. A fire suppression system comprising the apparatus of claim 1.

17. A method of testing a fire suppression system using the apparatus of claim 1, comprising:

providing the supply of pressurized air through the fire suppression system using the blower;

measuring the pressure of the air at the inlet valve of the fire suppression system and outputting the one or more output signals indicative of the pressure of the air at the inlet valve;

measuring the pressure of the air at the one or more outlets of the fire suppression system and outputting the one or more output signals indicative of the pressure of the air at the one or more outlets; and conveying the one or more output signals indicative of the pressure of the air at the inlet valve and the one or more output signals indicative of the pressure of the air at the one or more outlets to the processing system configured to determine from said one or more output signals the flow rate of the air supply at the one or more outlets.

18. The method of claim 17, comprising determining a condition of the fire suppression system from the output signals.

19. The method of claim 17 or 18, comprising at least one of:

measuring the flow rate of the air at the inlet valve;

outputting an output signal indicative of the flow rate of air at the inlet valve; and conveying the output signal to the processing system;

comparing the output signal indicative of the flow rate of air at the inlet with the output signals from the outlets; and determining a condition of the fire suppression system by comparing the flow rate of the air supply at the one or more outlets to a reference signal.

20. The method of claim 17, comprising at least one of:

comparing the results of the test method with a previous wet test;

subsequently performing a wet test and comparing the results of the test method with the subsequent wet test.

21. The method of claim 17, comprising:

performing the test method at a first time period to provide a first test data set indicative of the condition of the fire suppression system;

performing the test method or an inert gas test at a second time period to provide a second test data set indicative of the condition of the fire suppression system; and outputting the first data set and the second data set.

22. The method of claim 21, comprising performing a comparison of the first data set and the second data set to determine a condition of the fire suppression system.

* * * * *